Dec. 30. 1924.
F. W. WALKER
EDUCATIONAL DEVICE
Filed Jan. 30, 1923     3 Sheets-Sheet 1
1,521,491
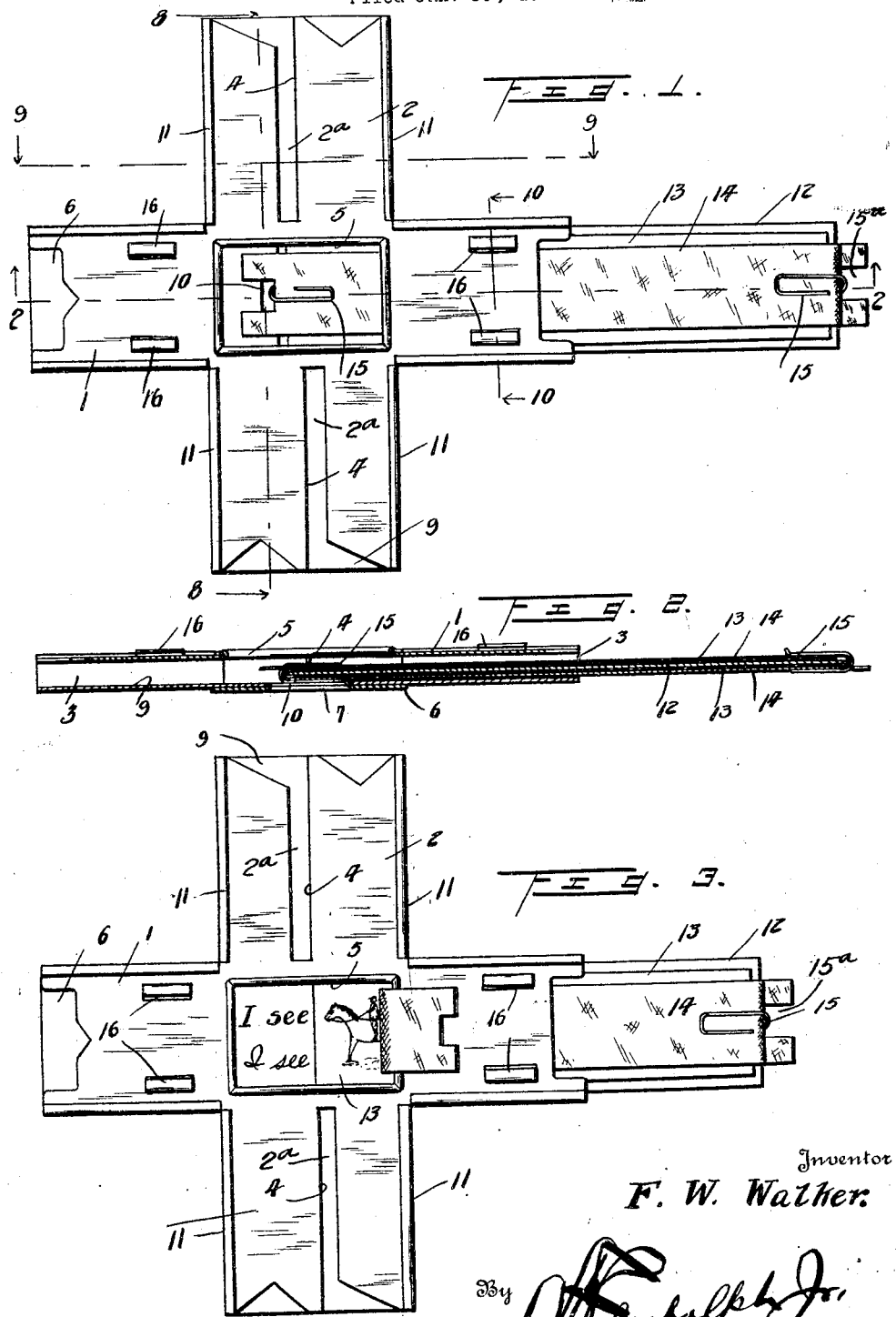

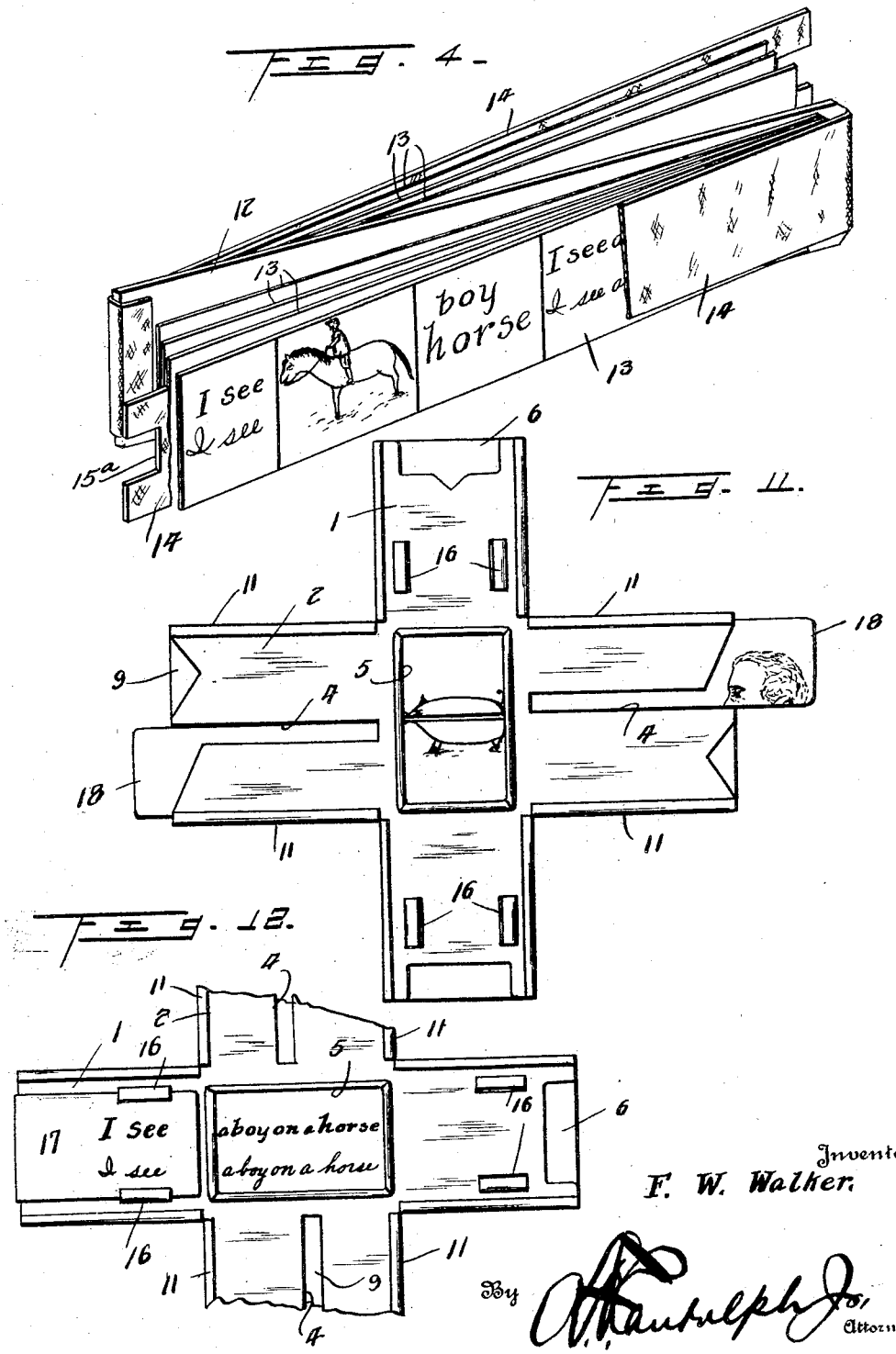

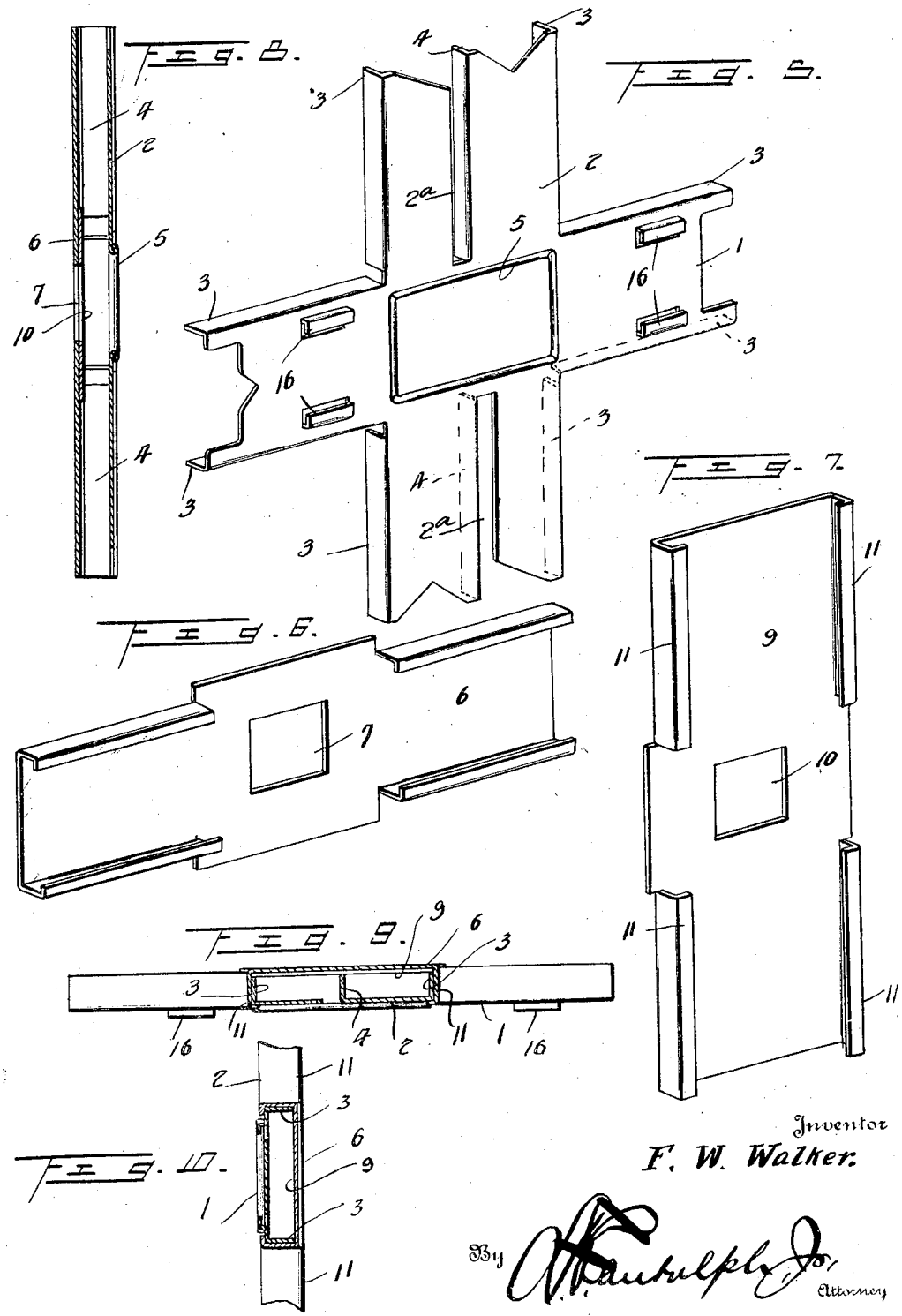

Patented Dec. 30, 1924.

1,521,491

UNITED STATES PATENT OFFICE.

FRED W. WALKER, OF HARRISON, ARKANSAS.

EDUCATIONAL DEVICE.

Application filed January 30, 1923. Serial No. 615,868.

*To all whom it may concern:*

Be it known that I, FRED W. WALKER, a citizen of the United States, residing at Harrison, in the county of Boone and State of Arkansas, have invented certain new and useful Improvements in Educational Devices; and I do hereby declare the following to be a full, clear, and exact description of the invention, such as will enable others skilled in the art to which it appertains to make and use the same.

The present invention provides means designed chiefly for training and educating children, youths and the immature, whereby to cultivate observation, discrimination and the reasoning faculties by an association of words, articles, symbols and pictures, such words, characters and the like being provided upon slips which are adapted to be associated in conjunction with a device which holds them in the required adjusted position and exposes portions illustrative of the lesson and concealing other portions so as to prevent confusion in the mind of the pupil.

Other objects and advantages will be apparent and suggest themselves as the nature of the invention is understood.

While the drawings illustrate an embodiment of the invention, it is to be understood that in adapting the same to meet different conditions and requirements, various changes in the form, proportion and minor details of construction may be resorted to without departing from the nature of the invention.

Referring to the accompanying drawings forming a part of the application,

Figure 1 is an elevation of an educational device embodying the invention, showing one manner of use, the book being in position in the holder to release the strip, Figure 2 is a longitudinal section on the line 2—2 of Fig. 1, Figure 3 is an elevation showing the cover of the book partly drawn through the opening of the holder, Figure 4 is a perspective view of the book, the strips on opposite sides of the divider being partly open, Figure 5 is a perspective view of the front plate of the holder, Figure 6 is a perspective view of one of the back plates of the holder, Figure 7 is a perspective view of the other back plate of the holder, Figure 8 is a vertical section on the line 8—8 of Figure 1, Figure 9 is a horizontal section on the line 9—9 of Figure 1, Figure 10 is a detail section on the line 10—10 of Figure 1, Figure 11 is a front view showing a different application, and Figure 12 is a front view showing a further application.

Corresponding and like parts are referred to in the following description and designated in the several views of the drawings by like reference characters.

An educational device constructed in accordance with the present invention embodies a book and a holder, the book comprising a plurality of separate strips bearing the educational matter and comprised between flexible covers which are disposed to open in opposite directions and upon opposite sides of a divider of press board or other stiff material. The holder is preferably constructed of sheet metal and is approximately of cruciform, one of the members having a single passage and the companion member comprising two parallel passages, said holder being of flat form and the passages of a size to receive the books or strips without binding or admitting of unnecessary play.

The holder comprises a front plate of cruciform shape and crossing back plates, each of the back plates corresponding with a member of the front plate, the back plates being juxtaposed and spaced slightly from the front plate to form passages for the reception of the books containing the educational matter. The front plate is distinguished by the arms 1 and 2 which have opposite edge portions bent laterally in the same direction to form flanges 3 of uniform depth or width. The flanges 3 determine the space between the front and back plates. Opposite end portions of the members 2 are formed with slits $2^a$ intermediate their longitudinal edges and a portion bordering upon each of the slits is bent laterally in the same direction as the flanges 3 to form an intermediate flange 4 which operates as spacing means and also as a partition to divide the space of the member 2 into parallel passages, each adapted to receive an educational strip whereby complemental strips may be independently adjusted and supported in the required adjusted position. In the preferred construction, the flanges 4 are disposed upon opposite sides of the slits. An elongated opening 5 is provided centrally of the front plate to disclose the matter provided on the educational strips after the same have been properly positioned in the holder.

The back plate 6 disposed opposite the member 1 of the front plate is formed with a central opening 7 and has opposite edge portions bent to embrace opposite edge portions of opposite ends of the member 1, whereby to hold the plate 6 in place. The back plate 9 has a central opening 10 to register with the opening 7 of the back plate 6 and has opposite edge portions of opposite ends bent to engage opposite edge portions of opposite ends of the member 2 of the front plate, whereby to hold the back plate 9 in position. The holder thus formed is light, durable and flat and is cruciform in outline so that complemental educational strips may be supported in crossing relation so that the matter upon one may coordinate with the matter upon the other when required, according to the nature of the lesson. The opposite bent edges of the plate 9 are indicated at 11.

The book comprises a divider 12, strips 13 and covers 14. The divider 12 is of stiff material such as press board, and the strips 13 and covers 14 are flexible. The strips and covers are disposed upon opposite sides of the divider 12 and the latter are attached permanently to opposite ends thereof so as to open in opposite directions, as indicated most clearly in Figure 4. The covers 14 are slightly longer than the book and the projecting or distal ends of the covers are adapted to be folded about the ends of the book and over the strips 13 and together with the strips removably secured as a packet or package by means of clips 15, which may consist of paper fasteners and which are accommodated in notches 15$^a$ of the covers. The strips 13 are separate from each other and adapted to contain educational matter of any character, according to the nature of the lesson to be given. The strips 13 contain words and pictorial representations symbolical of the words whereby the child may associate one with the other. It is to be understood that it may contain words only, or numbers or pictures, according to the nature of the instruction or training. When the educational strips are arranged in the said book form, the latter may be introduced into the holder by sliding movement until the innermost clip 15, as in Figure 1, clears the opening 5, whereupon the book is partly retracted so that said last mentioned clip 15 by abutment against the holder at opening 5 will be removed or displaced to enable the loose end of the cover to be grasped and drawn through the opening 5 thereby exposing the matter on the strips to be displayed. At the same time, the other clip 15 is removed by its engagement with the adjacent end of arm 1. After a full movement of the book in one direction, the displayed strip may be readily torn off. In this position, the other cover will have its free end opposite openings 7 and 10. The device is then reversed and the latter cover is gripped and pulled to expose the outermost strip of that side of the divider. In this manner, the device is adapted to be alternately reversed from one side to the other and to have the covers alternately pulled from one side and then from the other, with the strips being torn off after a full displaying movement thereof. If preferred, independent strips may be slipped into the members of the holder and adjusted to bring corresponding matter on each into position to bring about the result intended, according to the nature of the lesson to be selected. Coordinate strips bearing pictorial matter may have corresponding parts on each so that the strips may be adjusted to bring different portions into registering position according to the effect to be produced. The matching edges of coordinate strips may be straight or slightly curved to insure the registering pictorial matter being brought into close relationship.

The front of the holder has portions partly cut therefrom and pressed outwardly to form clips 16 which are adapted to engage a card 17 and retain the same in position. The clips 16 are preferably provided upon end portions of the member 1 upon opposite sides of the opening 5. The card 17, or like part, may be provided with matter adapted to be associated with the matter on the strip appearing at the opening 5 so as to be read in conjunction therewith. This is indicated most clearly in Figure 12 of the accompanying drawings. Figure 11 indicates coordinate strips 18, each bearing a part of the matter to be displayed and said strips being independently adjustable to bring required matter into registering or coordinate position, according to the effect to be produced.

What is claimed is:

1. An educational device comprising a divider, pluralities of strips disposed upon opposite sides of the divider and attached at opposite ends thereto and adapted to open in opposite directions.

2. An educational device comprising a divider, pluralities of strips disposed upon opposite sides of the divider and attached at opposite ends thereto and adapted to open in opposite directions, and flexible covers attached at opposite ends to the divider and projecting to be bent about the loose ends of the strips, and clips for securing the loose ends of the covers and strips to the divider.

3. An educational device comprising a divider, flexible elements extending from opposite ends of the divider, and strips secured to the divider by said flexible elements and arranged to open in opposite directions.

4. An educational device comprising a divider, flexible elements extending from opposite ends of the divider, and strips secured to the divider by said flexible elements and arranged to open in opposite directions, the distal ends of said flexible elements extending beyond the distal ends of the strip and being cut away to facilitate engagement of fasteners with said strip.

5. An educational device having a front plate provided with cross arms, said plate having an opening substantially at the intersection of said arms, one of said arms having an inturned flange integral with it on each side of said opening, back plates in cross relation having openings therethrough substantially in transverse alignment with the first mentioned opening, and interengaging flanges on said plates to space them apart inwardly of their margins.

6. An educational device comprising a holder provided with a display opening, a strip slidably associated with said holder and bearing educational matter, and a flexible member connected at one end to said strip and having its free end passing through said opening to permit said member to be grasped and pulled through said opening over one wall thereof so as to move said strip across said opening to display the educational matter thereon.

In testimony whereof I affix my signature in presence of two witnesses.

FRED W. WALKER.

Witnesses:
  J. L. WHITE,
  L. B. KIRBY.